(12) United States Patent
Parsley et al.

(10) Patent No.: US 7,100,692 B2
(45) Date of Patent: Sep. 5, 2006

(54) TERTIARY OIL RECOVERY COMBINED WITH GAS CONVERSION PROCESS

(75) Inventors: Alan John Parsley, Perth (AU); Christiaan Stouthamer, Perth (AU)

(73) Assignee: Shell Oil Company, Houston, TX (US)

( * ) Notice: Subject to any disclaimer, the term of this patent is extended or adjusted under 35 U.S.C. 154(b) by 23 days.

(21) Appl. No.: 10/486,806

(22) PCT Filed: Aug. 6, 2002

(86) PCT No.: PCT/EP02/08805

§ 371 (c)(1),
(2), (4) Date: Jul. 9, 2004

(87) PCT Pub. No.: WO03/016676

PCT Pub. Date: Feb. 27, 2003

(65) Prior Publication Data

US 2004/0244973 A1    Dec. 9, 2004

(30) Foreign Application Priority Data

Aug. 15, 2001 (EP) ................. 01306937

(51) Int. Cl.
  *E21B 43/16* (2006.01)
  *E21B 43/18* (2006.01)
(52) U.S. Cl. .................. 166/305.1; 166/268; 166/401; 166/402; 507/202; 518/702; 518/703
(58) Field of Classification Search ............ 166/268, 166/401, 402, 305.1; 507/202; 518/702, 518/703; 585/1, 2
See application file for complete search history.

(56) References Cited

U.S. PATENT DOCUMENTS

| | | | |
|---|---|---|---|
| 3,150,716 A * | 9/1964 | Strelzoff et al. ............ 166/268 |
| 3,232,885 A * | 2/1966 | Henke ........................ 252/372 |
| 3,653,438 A * | 4/1972 | Wagner ...................... 166/266 |
| 3,811,501 A | 5/1974 | Burnett et al. |
| 4,008,764 A | 2/1977 | Allen |
| 4,261,420 A | 4/1981 | Hitzman |
| 4,338,089 A | 7/1982 | Schaper et al. |
| 4,434,852 A | 3/1984 | Morel et al. |
| 4,499,946 A | 2/1985 | Martin et al. |
| 4,706,751 A | 11/1987 | Gondouin |
| 5,133,406 A * | 7/1992 | Puri ........................... 166/266 |
| 5,237,822 A | 8/1993 | Rathbone |
| 5,388,645 A | 2/1995 | Puri et al. |
| 5,566,755 A | 10/1996 | Seidle et al. |
| 5,769,165 A | 6/1998 | Bross et al. |
| 6,016,868 A | 1/2000 | Gregoli et al. |

FOREIGN PATENT DOCUMENTS

| | | |
|---|---|---|
| AU | 698392 | 10/1998 |
| EP | 0102190 | 3/1984 |
| EP | 0211957 | 3/1987 |
| EP | 0562893 | 9/1993 |
| EP | 0798524 | 10/1997 |
| EP | 1004746 | 5/2000 |
| EP | 0593703 | 6/2001 |
| JP | 71020125 | 6/1971 |
| JP | 71020126 | 6/1971 |
| JP | 2052980 | 2/1990 |
| JP | 8094245 | 4/1996 |
| NL | 8303318 | 4/1985 |
| SU | 947595 | 7/1982 |
| WO | 91/15446 | 10/1991 |
| WO | 97/12118 | 4/1997 |
| WO | 99/34917 | 7/1999 |

OTHER PUBLICATIONS

Petroleum Handbook, 6th edition, Elsevier, Amsterdam/NY 1983, pp. 97-110.
Petroleum Handbook, 6th edition, Elsevier, Amsterdam/NY 1983-91-97.
International Search Report mailed Nov. 19, 2002.
International Search Report mailed Nov. 19, 2002.
Ullmann's Encyclopedia of Industrial Chemistry, 5th Edition, vol. A 18, p. 332 ff. (VCH, Weinheim, 1991).
Rothrock, et al, "Nitrogen Floods Need Specialise Surface Equipment", Petroleum Engineer, Aug. 1977, pp. 22-26.
D. Rushing, et al., <<Miscible Displacement with Nitrogen>>, Petroleum Engineer, Nov. 1977, pp. 26-30.

* cited by examiner

*Primary Examiner*—George Suchfield

(57) ABSTRACT

A process for the recovery of oil from a subsurface reservoir in combination with the production of liquid hydrocarbons from a hydrocarbonaceous stream involving:
(i) separating an oxygen/nitrogen mixture into a stream enriched in oxygen and an oxygen depleted stream;
(ii) partial oxidation of the hydrocarbonaceous feed at elevated temperature and pressure using enriched oxygen produced in step (i) to produce synthesis gas;
(iii) converting synthesis gas obtained in step (ii) into liquid hydrocarbons; and
(iv) recovering oil from a subsurface reservoir using at least part of the oxygen depleted gas stream produced in step (i).

10 Claims, No Drawings

TERTIARY OIL RECOVERY COMBINED WITH GAS CONVERSION PROCESS

FIELD OF THE INVENTION

The present invention relates to a process for the enhanced recovery of oil from a subsurface reservoir in combination with the production of liquid hydrocarbons from a hydrocarbonaceous stream.

BACKGROUND OF THE INVENTION

Enhanced oil recovery (sometimes also called tertiary oil recovery) is the description applied by the oil industry to non-conventional techniques for getting more oil out of subsurface reservoirs than is possible by natural production mechanisms (primary oil recovery) or by the injection of water or gas (secondary oil recovery).

If oil is to move through the reservoir rock to a well, the pressure under which the oil exists in the reservoir must be greater than that at the well bottom. The rate at which the oil moves towards the well depends on a number of features, among which the pressure differential between the reservoir and the well, permeability of the rock, layer thickness and the viscosity of the oil. The initial reservoir pressure is usually high enough to lift the oil from the producing wells to the surface, but as the oil is produced, the pressure decreases and the production rate starts to decline. Production, although declining, can be maintained for a time by naturally occurring processes such as expansion of the gas in a gas cap, gas release by the oil and/or the influx of water. A more extensive description of natural production mechanisms can be found in the Petroleum Handbook, $6^{th}$ edition, Elsevier, Amsterdam/New York, 1983, p. 91–97.

The oil not producible, or left behind, by the conventional, natural recovery methods may be too viscous or too difficult to displace or may be trapped by capillary forces. Depending on the type of oil, the nature of the reservoir and the location of the wells, the recovery factor (the percentage of oil initially contained in a reservoir that can be produced by natural production mechanisms) can vary from a few percent to about 35 percent. Worldwide, primary recovery is estimated to produce on average some 25 percent of the oil initially in place.

In order to increase the oil production by natural production mechanisms, techniques have been developed for maintaining reservoir pressure. By such techniques (also known as secondary recovery) the reservoir's natural energy and displacing mechanism which is responsible for primary production, is supplemented by the injection of water or gas. However, the injected fluid (water or gas) does not displace all the oil. An appreciable amount remains trapped by capillary forces in the pores of the reservoir rock and is bypassed. This entrapped oil is known as residual oil, and it can occupy from 20 to 50 percent, or even more, of the pore volume. See for a more general description of secondary recovery techniques the above-mentioned Petroleum Handbook, p. 94–96.

Enhanced oil recovery (sometimes called tertiary oil recovery) is the description applied by the oil industry to non-conventional techniques for getting more oil out of subsurface reservoirs than is possible by natural production mechanisms or secondary production mechanisms. Many enhanced oil recovery techniques are known. It covers techniques as thermal processes, miscible processes and chemical processes. Examples are heat generation, heat transfer, steam drive, steam soak, polymer flooding, surfactant flooding, the use of hydrocarbon solvents, high-pressure hydrocarbon gas, carbon dioxide and nitrogen. See for a more general description of secondary recovery techniques the above-mentioned Petroleum Handbook, p. 97–110.

The use of nitrogen in enhanced oil recovery processes is well known. At first waste gases as stack gas, flue gas and exhaust gas were used. These gasses usually contained not only nitrogen, but also carbon dioxide and optionally steam. See for instance U.S. Pat. No. 4,499,946. A problem, however, was the presence of certain waste products such as nitrogen oxides and sulphur oxides which give rise to corrosion and pollution problems. A paper by M. D. Rushing et al., entitled "Miscible Displacement with Nitrogen", Petroleum Engineer, November 1977, p. 26–30, describes a miscible oil displacement process involving the injection of high pressure nitrogen. As disclosed, pure nitrogen is injected into the reservoir and functions to initially strip relatively low molecular weight hydrocarbons from the reservoir oil. U.S. Pat. No. 4,434,852 describes the use of nitrogen and 2 to 20 percent by volume of light hydrocarbons in the enhanced oil recovery of subterranean oil reservoirs. Mixtures of nitrogen and carbon dioxide are described in U.S. Pat. Nos. 3,811,501 and 4,008,764. The injected gas may take the form of substantially pure nitrogen, such as produced by cryogenic fractionation of air as described by Rothrock et al., Nitrogen Floods Need Specialise Surface Equipment, Petroleum Engineer, August 1977, p. 22–26. As described above, the nitrogen gas may also take the form of flue gasses such as from boilers or internal combustion engines which typically will contain about 80–90% nitrogen, usually 88%, 5–15% carbon dioxide, usually 10%, 0–2% carbon monoxide, usually 1%, and the remainder hydrogen and trace amounts of other gasses.

As described, attention has been given to producing nitrogen cryogenically. A problem, however, is the need of a large, expensive cryogenic unit.

Several cryogenic concepts have been developed over the years to liquefy and separate air into its main constituents nitrogen, oxygen and rare gases. Refrigeration for cryogenic applications is produced by absorbing or extracting heat at low temperature and rejecting it to the atmosphere at higher temperatures. Three general methods for producing cryogenic refrigeration in large-scale commercial application are the liquid vaporisation cycle, the Joule-Thomson expansion cycle and the engine expansion cycle. The first two are similar in that they both utilise irreversible isenthalpic expansion of a fluid, usually through a valve. Expansion in an engine approaches reversible isenthalpic expansion with the performance of work. For more detailed discussion reference is made to Perry's Chemical Engineers Handbook, Sixth Edition, 12–49 ff. (McGraw-Hill, New York, 1984), Kirk-Othmer, Encyclopedia of Chemical Technology, Fourth Edition, Volume 7, p. 662 ff. (John Wiley and Sons, New York, 1993) and Ullmann's Encyclopedia of Industrial Chemistry, Fifth Edition, Volume A 18, p. 332 ff. (VCH, Weinheim, 1991).

Most commercial air separation plants are based on Linde's double distillation column process. This process is clearly described in the above references. In a typical example, feed air is filtered and compressed to a pressure usually between 5 and 10 bara. The compressed air is cooled and any condensed water is removed in a separator. To avoid freezing of water and carbon dioxide in the cryogenic part of the plant, the feed air is further passed through an adsorbent bed, usually activated alumina and/or molecular sieves, to remove the last traces of water and carbon dioxide. The purified air is than cooled down further, and fed to a first cryogenic distillation unit, usually at an intermediate stage. Crude liquid material from the bottom section of the first distillation unit, usually comprising between 40 and 50 mol percent oxygen, is fed to the second distillation unit (which second unit is usually on the top of the first distillation unit, the condenser of the first column usually acting as the reboiler for the second unit), usually also at an intermediate stage. The second distillation unit is operated at relatively low pressure (usually 1 to 2 bara). At the top of the first distillation unit almost pure liquid nitrogen is obtained which is typically fed to the second column at the top. Pure liquid oxygen is obtained at the bottom of the second distillation unit, while pure gaseous nitrogen is obtained from the top of the second column.

Many variations on the above concept are known. These include separation of air into gaseous products, liquid products and all kind of combinations thereof. Also the production of partly enriched oxygen and/or nitrogen streams together with almost pure oxygen and/or nitrogen streams, either in liquid or gaseous phase is well known. In addition there may be additional distillation units to separate any of the rare gases present in the feed air. Further, the methods for creating the low temperatures may vary in many ways. In this respect reference is made to the above cited literature references, and further to EP 798524, JP 08094245, EP 593703, EP 562893, U.S. Pat. No. 5,237,822, JP 02052980, EP 211957, EP 102190, SU 947595 JP 71020126 and JP 71020125.

The nitrogen produced in an air separation unit is usually vented to the atmosphere. This is at least partly due to the fact that, especially gas-to-liquids, plants (using so called stranded gas) are usually at remote locations, far away from industrial activities which could use the nitrogen. Up till now no suggestion has been made to use the nitrogen for enhanced oil recovery, while there are sufficient locations at which the nitrogen produced in the air separation unit could be used for enhanced oil recovery. This is the more remarkable as several suggestions have been made as to the use of other side products from gas-to-liquids plants, as energy and water.

Many publications are known describing processes for the conversion of (gaseous) hydrocarbonaceous feed stocks, as methane, natural gas and/or associated gas, into liquid products, especially methanol and liquid hydrocarbons, particularly paraffinic hydrocarbons. In this respect often reference is made to remote locations (e.g. in the dessert, tropical rairi-forest) and/or offshore locations, where no direct use of the gas is possible, usually due to the absence of large populations and/or the absence of any industry. Transportation of the gas, e.g. through a pipeline or in the form of liquefied natural gas, requires extremely high capital expenditure or is simply not practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution. Gas found together with crude oil is known as associated gas, whereas gas found separate from crude oil is known as natural gas or non-associated gas. Associated gas may be found as "solution gas" dissolved within the crude oil, and/or as "gas cap gas" adjacent to the main layer of crude oil. Associated gas is usually much richer in the larger hydrocarbon molecules (ethane, propane, butane) than non-associated gas.

In WO 91/15446 a process is described to convert natural gas, particularly remote location natural gas (including associated gas), into liquid hydrocarbons suitable for use as fuel. However, no optimally integrated, efficient, low-cost process scheme has been described. In WO 97/12118 a method and system for the treatment of a well stream from an offshore oil and gas field has been described. Natural gas is converted into syngas using pure oxygen in an autothermal reformer, a combination of partial oxidation and adiabatic steam reforming. The syngas (comprising a considerable amount of carbon dioxide) is converted into liquid hydrocarbons and wax. No fully and optimally integrated process scheme for a highly efficient, low capital process is described in this document.

In EP 1 004 746 a process has been described for the combined production of liquid hydrocarbons and the recovery of oil from a subsurface reservoir by partial oxidation of natural gas followed by conversion of the synthesis gas thus obtained into hydrocarbons and separating the hydrocarbons into liquid hydrocarbons and gaseous hydrocarbons (mainly $C_1$–$C_4$ hydrocarbons), and combusting and/or expanding these gaseous hydrocarbons to provide power for the secondary or enhanced recovery of oil. However, a further optimisation of the efficiency and the integration of the process is desired.

The present invention is directed to a process for the recovery of oil from a subsurface reservoir in combination with the production of liquid hydrocarbons from a hydrocarbonaceous stream, comprising:

(i) separating an oxygen/nitrogen mixture into a stream enriched in oxygen and an oxygen depleted stream;

(ii) partially oxidating the hydrocarbonaceous feed at elevated temperature and pressure using enriched oxygen produced in step (i) to produce synthesis gas;

(iii) converting synthesis gas obtained in step (ii) into liquid hydrocarbons;

(iv) recovering oil from a subsurface reservoir using at least part of the oxygen depleted gas stream produced in step (i).

DETAILED DESCRIPTION OF THE INVENTION

An object of the present invention is to provide further improvements for an efficient, low cost, process- and energy-integrated process scheme for the production of (easily manageable) liquid and solid hydrocarbons from light hydrocarbons. The further improvement concerns the combined production of hydrocarbons and the enhanced recovery of oil from subsurface reservoirs. It has been found that an efficient process could be developed by separating an oxygen/nitrogen mixture, especially air, into an oxygen rich stream and an enriched nitrogen stream, preferably a pure, i.e. at least 98 vol % pure, nitrogen stream. The oxygen rich stream can be used for the partial oxidation of the natural gas, while the nitrogen stream can be used for enhanced oil recovery. It is observed in this respect that hydrocarbons synthesis starting from synthesis gas made from a hydrocarbonaceous feed and oxygen made by an air separation unit is well known. However, up till now it has not been realised that the nitrogen, made in the same process, could be used in the enhanced oil recovery. In this respect it is observed that several processes are known for the production of synthesis gas which do not use pure oxygen, such as steam methane reforming and (partly) autothermal reforming. Further, also air may be used in the preparation of synthesis gas. Thus, a number of options for the preparation of synthesis gas for use in the Fischer-Tropsch synthesis are available.

The process combines one of the many processes for enhanced oil recovery and one of the possible options for the preparation of hydrocarbons from synthesis gas.

An advantage of the process is that the cheap and clean nitrogen which is produced in the air separation step in order to produce oxygen or oxygen enriched air, may be used in the enhanced oil recovery. This results in a more efficient use of the energy required for the two processes. In addition, less capital is needed. Oil and gas fields are often found in each other's vicinity. For instance, in Nigeria and the Middle East many oil and/or gas fields have been found close to each other. Other regions show the similar patterns. Converting the gas into liquid hydrocarbons in the way as described above, results in a nitrogen stream which now may be used for the enhanced oil recovery of the adjacent oil fields. Thus, avoiding disadvantages such as the transport of nitrogen over long distances. As no additional energy is required for the production of the nitrogen, less environmentally unfriendly carbon dioxide is produced.

The separation of the oxygen/nitrogen mixture is suitably carried out according to a cryogenic process, such as those described above. These processes are commercially available, and known to one skilled in the art. The oxygen/nitrogen mixture used in step (i) is preferably air. Suitably, the stream enriched in oxygen contains at least 50 mol %, more suitably 85 mol % oxygen, based on the total stream, preferably 95 mol %, more preferably 98 mol %. Suitably the oxygen depleted stream contains at least 95 mol % nitrogen based on the total stream, preferably 98 mol %, more preferably 99 mol %. The oxygen depleted stream contains at most 2 mol % oxygen based on the total stream, preferably at most 1 mol %, more preferably at most 0.2 mol %. If desired, all traces of oxygen may be removed.

The hydrocarbonaceous feed to be used in the present process is may suitably be methane, natural gas, associated gas or a mixture of $C_{1-4}$ hydrocarbons, preferably associated gas, more preferably associated gas at a remote location. Other possible hydrocarbonaceous feedstocks are coal, brown coal, peat, heavy hydrocarbons, e.g. crude oil residues, e.g. pitch, and asphaltenes, and bio fuel, e.g. wood, organic waste products and vegetable oils.

The partial oxidation may be carried out in an oxidation or gasification reactor. A well known process for the partial oxidation of a hydrocarbonaceous feed is the Shell Gasification Process in which the hydrocarbonaceous feed is partially combusted in a non-catalytic process at elevated temperature and pressure. In another embodiment the oxidation is carried out in the presence of a catalyst. Such catalysts are well known in the art and usually comprise one or more noble Group VIII metals. Steam and/or carbon dioxide may be added to the hydrocarbonaceous feed stream in order to adjust the $H_2/CO$ ratio. The oxidation may suitably be carried out at temperatures between 900° C. and 1500° C., preferably 1000° C. to 1350° C., and a pressure between 5 bar and 120 bar, especially between 25 bar and 70 bar. Typically, the gaseous mixture has an $H_2/CO$ ratio between 1:1 and 3:1, preferably about 2:1. Prior to contacting the gaseous mixture with a catalyst for the conversion of this gaseous mixture into liquid hydrocarbons, it is preferred to remove compounds which could adversely effect the catalyst. In this respect reference is made to the removal of sulphur containing compounds and nitrogen containing compounds (e.g. $NH_3$ and HCN).

The purified gaseous mixture, comprising predominantly hydrogen and carbon monoxide, may be contacted with a catalyst in the catalytic conversion stage, by which these compounds are converted into liquid hydrocarbons. These liquid hydrocarbons may comprise paraffinic hydrocarbons, methanol, aromatic hydrocarbons and the like.

The catalysts used for the catalytic conversion of the mixture comprising hydrogen and carbon monoxide into especially paraffinic hydrocarbons are known in the art and are usually referred to as Fischer-Tropsch catalysts. Catalysts for use in this process frequently comprise, as the catalytically active component, a metal from Group VIII of the Periodic Table of Elements. Particular catalytically active metals include ruthenium, iron, cobalt and nickel. Cobalt is a preferred catalytically active metal. As discussed before, preferred hydrocarbonaceous feeds are natural gas or associated gas. As these feedstocks usually results in synthesis gas having $H_2/CO$ ratio's of about 2, cobalt is a very good Fischer-Tropsch catalyst as the user ratio for this type of catalysts is also about 2.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania.

The amount of catalytically active metal on the carrier is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are very suitable promoters. Particularly preferred metal oxide promoters for the catalyst used to prepare the waxes for use in the present invention are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200° C. to 350° C. Other processes for the preparation of Fischer-Tropsch catalysts comprise kneading/mulling, often followed by extrusion, drying/calcination and activation.

The catalytic conversion process may be performed under conventional synthesis conditions known in the art. Typically, the catalytic conversion may be effected at a temperature in the range of from 150° C. to 300° C., preferably from 180° C. to 260° C. Typical total pressures for the catalytic conversion process are in the range of from 1 bar to 200 bar absolute, more preferably from 10 bar to 70 bar absolute. In the catalytic conversion process especially more than 75 wt % of $C_5+$, preferably more than 85 wt % $C_5+$hydrocarbons are formed. Depending on the catalyst and the conversion conditions, the amount of heavy wax ($C_{20}+$) may be up to 60 wt %, sometimes up to 70 wt %, and sometimes even up till 85 wt %. Preferably a cobalt catalyst is used, a low $H_2/CO$ ratio is used (especially 1.7, or even lower) and a low temperature is used (190–230° C.). To avoid any coke formation, it is preferred to use an $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955. Preferably the Fischer-Tropsch hydrocarbons stream comprises at least 35 wt % $C_{30}+$, preferably 40 wt %, more preferably 50 wt %.

Preferably, a Fischer-Tropsch catalyst is used, which yields substantial quantities of paraffins, more preferably substantially unbranched paraffins. A most suitable catalyst for this purpose is a cobalt-containing Fischer-Tropsch catalyst. Such catalysts are described in the literature, see e.g. AU 698392 and WO 99/34917.

The Fischer-Tropsch process may be a slurry FT process or a fixed bed FT process, especially a multitubular fixed bed, preferably a three phase fluidised bed process.

Alternatively the gaseous mixture may be converted, using a bifunctional catalyst, in a first step into acyclic hydrocarbons and/or acyclic oxygen containing hydrocarbons. The product formed may be at least partially converted in a second step into aromatic hydrocarbons suitable as high octane gasoline and chemical intermediates.

Suitable bifunctional catalysts are known in the art. These catalysts comprise a first catalyst component having activity for the conversion of synthesis gas into acyclic hydrocarbons and/or acyclic oxygen-containing hydrocarbons, such as methanol and dimethyl ether, in combination with a second catalyst component having activity for the conversion of the acyclic compounds mentioned into aromatic hydrocarbons. This first catalyst component comprises at least one metal from the iron group or ruthenium together with one or more promoters to increase the activity and/or selectivity, and sometimes a carrier material such as kieselguhr, such as catalysts containing from 30 to 75 parts by weight iron, and from 5 to 40 parts by weight magnesium per 100 parts by weight alumina. The preparation of the catalyst is similar to that of Fischer-Tropsch catalysts mentioned above. Other suitable catalysts are $ZnO/Cr_2O_3$ compositions, in particular such compositions in which the atomic percentage of zinc, based on the sum of zinc and chromium, is at least 60%, and preferably from 60 to 80%. Details of the catalyst and process may be found in the art, for example U.S. Pat. No. 4,338,089.

Suitable examples of the second catalyst component for the production of aromatic hydrocarbons are crystalline silicates, for instance crystalline aluminium silicates (zeolites), crystalline iron silicates and crystalline gallium silicates.

The reaction may be carried out at temperatures of from 200 to 500° C., preferably from 250 to 450° C., at a pressure of from 1 to 150 bar, preferably 5 to 100 bar, and a GHSV between 50 and 5000 Nl/l/h, preferably 300 to 3000 Nl/l/h.

Alternatively, the gaseous mixture comprising hydrogen and carbon monoxide may serve as a starting material for the preparation of methanol, using any suitable catalytic methanol synthesis process. In this invention methanol is also considered a liquid hydrocarbon.

The recovery of oil from a subsurface reservoir using the oxygen depleted stream as obtained in the first step of the present process is known to one skilled in the art. In this respect, reference is made to the discussion above concerning the enhanced oil recovery using nitrogen and the references cited. Suitably, nitrogen, optionally in combination with carbon dioxide and/or steam (individually or in selected mixtures) may be injected down-hole at controlled temperature and pressure into the formation. Such injections may be continuously with recovery at a production well spaced therefrom, or cyclic with recovery at the injected well ("huff and puff"). The actual requirements will vary from field to field. Temperatures may vary from 20° C. (for miscible light crudes) to 450° C., or even to 600° C., for very heavy crudes. Pressures should be in excess of the formation pressure, usually 2 bar to 50 bar in excess.

The process of the present invention may suitably be combined with further additional oil production techniques. In this respect, a preferred embodiment is a process in which the oxygen depleted stream is mixed with carbon dioxide. This carbon dioxide is especially produced in the process in which the synthesis gas obtained in step (ii) is converted into liquid hydrocarbons. Carbon dioxide may be present in one or more (recycle) streams from which it may be extracted, or may be obtained by burning certain waste streams as Fischer-Tropsch off gas. In another preferred embodiment of the invention, light hydrocarbons are mixed with the nitrogen stream. These light hydrocarbons, suitably $C_1$ to $C_4$ hydrocarbons, especially methane, may (at least partly) have been produced in the hydrocarbon synthesis reaction.

We claim:

1. A process for the recovery of oil from a subsurface reservoir in combination with the production of liquid hydrocarbons from a hydrocarbonaceous feed stream comprising:
   (i) separating an oxygen/nitrogen mixture into a stream enriched in oxygen and an oxygen depleted stream;
   (ii) partially oxidating the hydrocarbonaceous feed at elevated temperature and pressure using enriched oxygen produced in step (i) to produce synthesis gas;
   (iii) converting synthesis gas obtained in step (ii) into liquid hydrocarbons; and
   (iv) recovering oil from a subsurface reservoir using at least part of the oxygen depleted gas stream produced in step (i).

2. The process of claim 1, in which the oxygen/nitrogen mixture used in step (i) is air.

3. The process of claim 1, in which the stream enriched in oxygen comprises at least 85 mol % oxygen based on the total stream.

4. The process of claim 1, in which the oxygen depleted stream comprises at least 95 mol % nitrogen based on the total stream.

5. The process of claim 4, in which the oxygen depleted stream comprises at most 2 mol % oxygen based on the total stream.

6. The process of claim 1, in which the hydrocarbonaceous feed is selected from the group consisting of: methane, natural gas, associated gas and a mixture of $C_{1-4}$ hydrocarbons.

7. The process of claim 6, in which the associated gas is associated gas at a remote location.

8. The process of claim 1, further comprising additional oil production techniques.

9. The process of claim 1, in which the oxygen depleted stream is mixed with carbon dioxide.

10. The process of claim 9, in which the carbon dioxide is produced in the overall process in which the synthesis gas obtained in step (ii) is converted into liquid hydrocarbons.

* * * * *